(12) United States Patent
Kanno et al.

(10) Patent No.: US 8,028,785 B2
(45) Date of Patent: Oct. 4, 2011

(54) ELECTRIC MOTORCYCLE

(75) Inventors: Yoshihisa Kanno, Saitama (JP);
Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 12/567,525

(22) Filed: Sep. 25, 2009

(65) Prior Publication Data
US 2010/0078248 A1   Apr. 1, 2010

(30) Foreign Application Priority Data
Sep. 30, 2008   (JP) .................... 2008-255309

(51) Int. Cl.
*B60K 1/00*   (2006.01)
(52) U.S. Cl. .............. 180/220; 180/227; 180/228
(58) Field of Classification Search .............. 180/220, 180/227, 228, 229
See application file for complete search history.

(56) References Cited

U.S. PATENT DOCUMENTS
6,276,481 B1 *  8/2001  Matsuto et al. ............... 180/220
7,210,550 B2 *  5/2007  Yonehana .................... 180/220

FOREIGN PATENT DOCUMENTS
JP          4-257783 A       9/1992

* cited by examiner

*Primary Examiner* — Kevin Hurley
(74) *Attorney, Agent, or Firm* — Birch, Stewart, Kolasch & Birch, LLP

(57) ABSTRACT

An electric motorcycle in which the disposition space of a motor is downsized, the number of components is reduced, and the power transmission efficiency is improved. In an electric motorcycle, a swing arm is swingably supported by a vehicle body frame and supports a power generating motor. A driving shaft of the power generating motor and a rear wheel axle of a rear wheel are coupled together. A driving force of the power generating motor is transmitted to the rear wheel. In the electric motorcycle, the driving shaft of the power generating motor is disposed generally in parallel to the rear wheel axle of the rear wheel. A driving gear is provided on the driving shaft. A driving gear is in meshing engagement with a reduction gear provided on the rear wheel axle. The driving gear has a smaller diameter than that of the reduction gear. A driving force of the power generating motor is transmitted to the rear wheel axle through a reduction.

20 Claims, 11 Drawing Sheets

ELECTRIC MOTORCYCLE

CROSS-REFERENCE TO RELATED APPLICATIONS

This application claims priority under 35 U.S.C. §119(a) to Application No. 2008-255309, filed in Japan on Sep. 30, 2008, the entirety of which is expressly incorporated herein by reference.

BACKGROUND OF THE INVENTION

1. Field of the Invention

The present invention relates to an electric motorcycle driven by a power generating motor.

2. Description of Background Art

In the past, an electric motorcycle carrying a battery, which supplies a power source to drive a power generating motor for traveling, is known. In such an electric motorcycle, a pulley provided to a motor shaft of a power generating motor and a pulley provided to a rear wheel axle are coupled by a drive belt. The driving force of the power generating motor is transmitted to the rear wheel axle via the drive belt (for example, see JP-A No. H4-257783).

SUMMARY OF THE INVENTION

However, in the above-mentioned conventional electric motorcycle, the power generating motor is disposed separately from the rear wheel axle. Therefore, the disposition space of the power generating motor is large. Since the pulley provided to the motor shaft of the power generating motor, the pulley provided to the rear wheel axle, and the drive belt coupling each pulley are necessary, the number of components is large and power transmission is inefficient.

In view of the situation mentioned above, the present invention is made to provide an electric motorcycle in which disposition space of a motor is downsized, the number of components is reduced, and power transmission efficiency is improved.

For addressing the above problem, in an electric motorcycle of the present invention, a swing arm swingably supported by a vehicle body frame supports a power generating motor, a driving shaft of the power generating motor and a rear wheel axle of a rear wheel are coupled to transmit driving force of the power generating motor to the rear wheel. The driving shaft of the power generating motor is disposed generally in parallel with the rear wheel axle of the rear wheel. A driving gear is provided on the driving shaft. The driving gear is in meshing engagement with a reduction gear provided on the rear wheel axle. The driving gear has a smaller diameter than that of the reduction gear. The driving force of the power generating motor is transmitted to the rear wheel axle through a reduction.

In the present invention, the driving gear is directly coupled to the reduction gear. Therefore, the power generating motor can be disposed close to the rear wheel axle, and the disposition space of the power generating motor can be downsized. Since a conventional pulley provided to a motor shaft of a power generating motor, a conventional pulley provided to a rear wheel axle, and a conventional drive belt coupling each pulley are unnecessary, the number of components can be reduced, and power transmission efficiency can also be improved.

In this case, a gear cover may be provided to cover a power transmission portion including the driving gear and the reduction gear. The inside of the gear cover may be sealed. The driving force transmission space may be filled with lubricating oil.

Since the driving force transmission space is filled with lubricating oil, which is circulated in the power transmission portion including the driving gear and the reduction gear, the power transmission portion is smoothly driven.

A device attachment space disposed to the outer side of the vehicle body and an air introduction space disposed to the inner side of the vehicle body are formed by a partition wall inside the swing arm. The power generating motor and a PDU for controlling the power generating motor are contained in the device attachment space. A driving shaft of the power generating motor penetrates the partition wall from the device attachment space to the air introduction space. The gear cover may define a driving force transmission space and an air introduction space. The PDU may be disposed forward of the power generating motor in the vehicle body. By directly coupling the driving gear and the reduction gear, marginal space is generated in the swing arm. The PDU for controlling the power generating motor can be contained in this space, the power generating motor can be disposed close to the rear wheel axle, and the disposition space of the power generating motor can be downsized. Since the gear cover defines the driving force transmission space and the air introduction space, the inside of the driving force transmission space can be filled with lubricating oil.

In planar view, the driving shaft may be disposed to the rear end of the swing arm and within the wheel width of the rear wheel in the fore-and-aft direction.

The driving force can be efficiently transmitted using the minimum number of gears without increasing the number of driving gears because the driving shaft is disposed close to the rear wheel axle. In addition, by driving the rear wheel via the driving gear to match a usage rotation zone of the power generating motor and a speed zone of the vehicle, it also becomes unnecessary to enlarge the power generating motor more than needed.

In the present invention, a driving shaft of a power generating motor is disposed generally in parallel with a rear wheel axle of a rear wheel. A driving gear is provided on the driving shaft. The driving gear is in meshing engagement with a reduction gear provided on the rear wheel axle. The driving gear has a smaller diameter than that of the reduction gear. A driving force of the power generating motor is transmitted to the rear wheel axle. Accordingly, since the driving gear is directly coupled to the reduction gear, the power generating motor can be disposed close to the rear wheel axle, and the disposition space of the power generating motor can be downsized. Since a conventional pulley provided in a motor shaft of a power generating motor, a conventional pulley provided to a rear wheel axle, and a conventional drive belt connecting each belt pulley are unnecessary, the number of components can be reduced and power transmission efficiency can also be improved.

A gear cover is provided to cover a power transmission portion including the driving gear and the reduction gear. Therefore, the inside of the gear cover is sealed, and the driving force transmission space is filled with lubricating oil, which is circulated in the power transmission portion including the driving gear and the reduction gear. Therefore, the power transmission portion is driven smoothly.

Further, by coupling the driving gear and the reduction gear directly, marginal space is produced inside the swing arm and can contain a PDU for controlling the power generating motor. The power generating motor can be disposed close to the rear wheel axle. The disposition space of the power generating motor can be downsized. Since the gear cover defines a driving force transmission space and an air introduction space, the inside of the driving force transmission space can be filled with lubricating oil.

A Driving force can be efficiently transmitted using a minimum number of gears without increasing the number of driving gears, because the driving shaft is disposed at the rear end of the swing arm and in the width of the rear wheel in the fore-and-aft direction in planar view and is disposed close to the rear wheel axle. In addition, by driving the rear wheel via the driving gear to match the usage rotation zone of the power generating motor and the speed zone of the vehicle, it also becomes unnecessary to enlarge the power generating motor more than needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
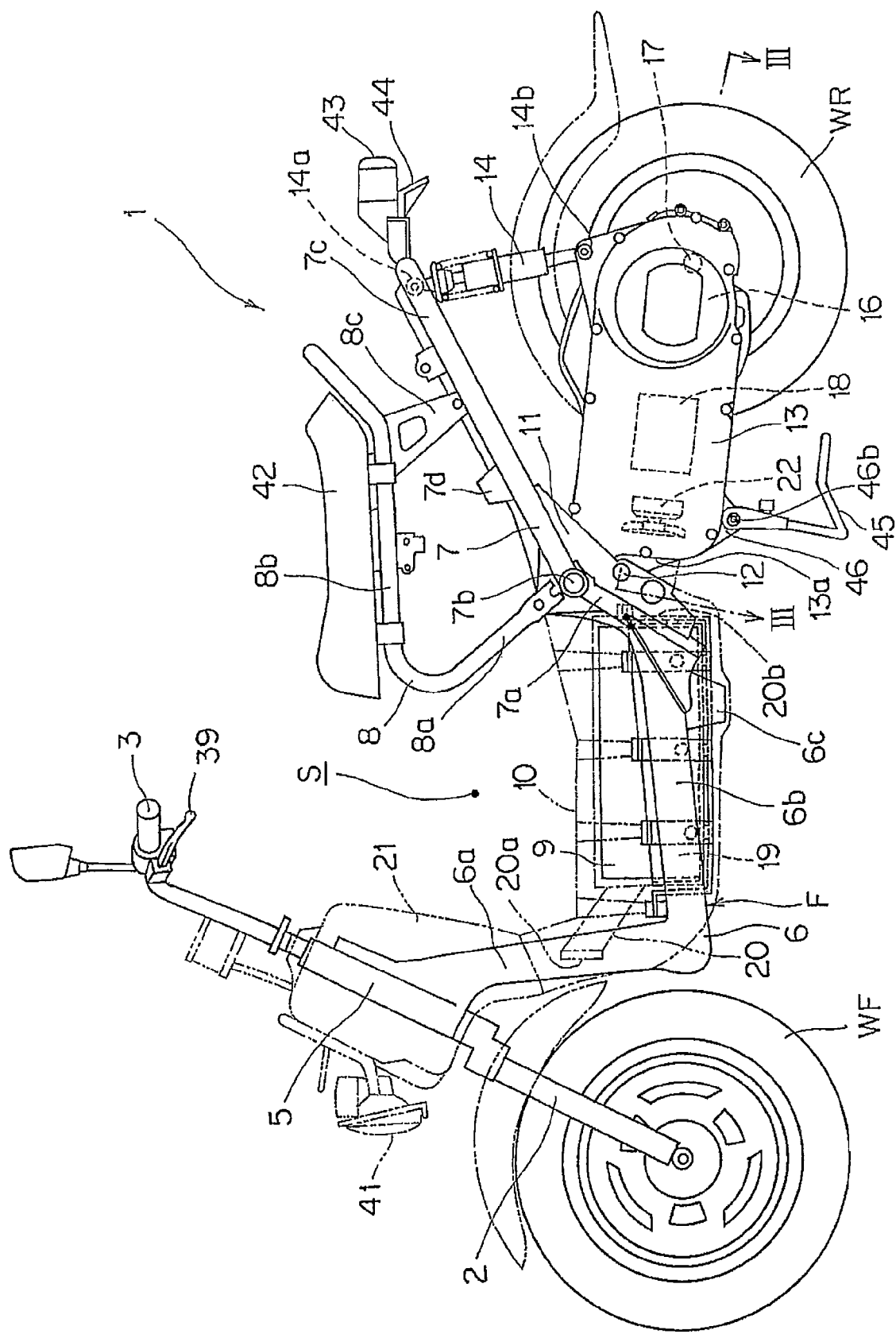
FIG. 1 is a side view of an electric motorcycle of an embodiment of the present invention.

The present invention will now be described with reference to the accompanying drawings, wherein the same reference numerals have been used to identify the same or similar elements throughout the several views. Vertical, fore-and-aft, and left-and-right directions described in the following explanation are ones seen from a driver.

Figure 2:
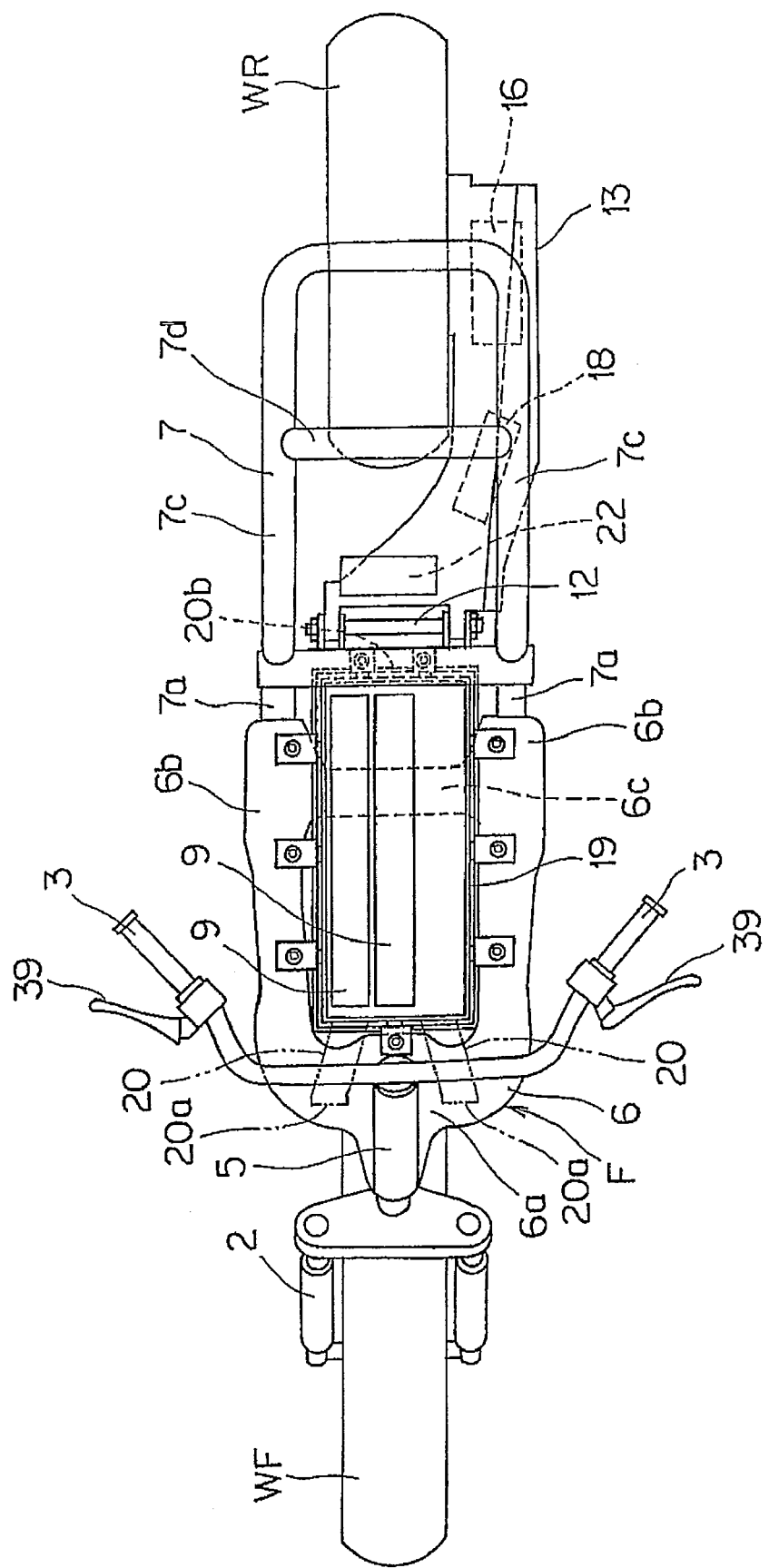
FIG. 2 is a planar view of FIG. 1.

FIG. 1 is a side view of a battery-driven electric vehicle of an embodiment of the present invention. FIG. 2 is a plane view of the electric vehicle. For ease of explanation, a seat rail 8, a fender cover 21, and a step floor 10 shown in FIG. 1 are not shown in FIG. 2.

As shown in FIG. 1, a front end of a vehicle body frame F of an electric motorcycle 1 includes: a head pipe 5 which steerably supports a front fork 2 journaling a front wheel WF; and a steering handlebar 3 coupled to the front fork 2. The vehicle body frame F includes a center frame 6, a rear frame 7, and a seat rail 8. As shown in FIG. 2, the frames 6, 7, and 8 are each structured symmetrically in pairs in the vehicle body width direction.

The center frame 6 includes an inclined portion 6a coupled to the above head pipe 5 and extending toward the rear of the vehicle body obliquely downward and horizontal portions 6b curving at the lower end of the inclined portion 6a and extending generally horizontally toward the rear of the vehicle body. As shown in FIG. 2, the center frame 6 is coupled by a cross member 6c for coupling the left and right horizontal portions 6b in the vehicle width direction.

The rear frame 7 includes: first inclined portions 7a extending obliquely upward from the rear ends of the horizontal portions 6b of the center frame 6 toward the rear of the vehicle body; and second inclined portions 7c extending obliquely upward from curving portions 7b curving at the rear ends of the first inclined portions 7a toward the rear of the vehicle body at a smaller inclination than that of the first inclined portions 7a. As shown in FIG. 2, the right and left second inclined portions 7c are coupled by a cross frame 7d extending in the vehicle body width direction.

Further, the seat rail 8 has a generally inverted U-shape attached above the rear frame 7, and includes: inclined portions 8a extending obliquely upward from the curving portions 7b of the rear frame 7 toward the forward of the vehicle body; horizontal portions 8b extending rearward from the upper ends of the inclined portions 8a; and support portions 8c extending rearward and obliquely downward from the rear portions of the horizontal portions 8b toward the second inclined portions 7c.

As shown in FIGS. 1 and 2, in the horizontal portions 6b of the center frame 6, batteries 9, mentioned later in detail, are contained in a battery box 19. The battery box 19 is attached by being sandwiched by a pair of left and right frames of the horizontal portions 6b. In the side view shown in FIG. 1, the bottom surface of the battery box 19 is disposed below the horizontal portions 6b. The center portion of the cross member 6c of the center frame 6 in the vehicle body width direction is depressed downward. The battery box 19 is fixed to be mounted on the cross member 6c.

The portion to which the battery box 19 is disposed is below a so-called foot rest space S. The upper side of the battery box 19 is covered with a step floor 10 for resting the feet of a rider.

The battery box 19 is formed to have a generally rectangular box shape, containing the batteries 9. In the battery box 19, the batteries 9 are arranged laterally. Air introduction ducts 20 for introducing open air into the battery box 19 are laterally provided to the front surface of the battery box 19. On the other hand, an outlet 20b for discharging the introduced air is formed on the rear surface of the battery box 19.

Accordingly, the batteries 9 are cooled by air introduced from an inlet 20a, and the air after cooling can be discharged from the outlet 20b.

As shown in FIG. 1, pivot plates 11 projecting toward the rear of the vehicle body are respectively provided on the left and right of the rear frame 7 near the coupling portion between the rear frame 7 and the center frame 6 and below the curving portions 7b. A pivot shaft 12 is provided penetrating the left and right pivot plates 11 in the vehicle width direction. The front end of a swing arm 13 is attached to the pivot shaft 12. The swing arm 13 pivots vertically about the pivot shaft 12.

The swing arm 13 is coupled to the second inclined portion 7c of the rear frame 7 via a rear suspension 14 disposed to the left in the vehicle body width direction. For more details, an upper end 14a of the rear suspension 14 is attached to the second inclined portion 7c of the rear frame 7, and a lower end portion 14b of the rear suspension 14 is attached to the rear portion of the swing arm 13. Accordingly, vertical vibration of the rear wheel WR supported by the rear end of the swing arm 13 is absorbed by the rear suspension 14.

A pair of pivot support portions 13b pivotally attached to the pivot shaft 12 is provided on the front end of the swing arm 13, while separating laterally in the vehicle body width direction. While the swing arm 13 is attached to the pivot shaft 12, the swing arm 13 extends rearward of the vehicle body along the left of the rear wheel WR after extending from the pivot shaft 12 (pivot support portions 13b) obliquely toward the rear of the vehicle body and obliquely left to avoid the rear wheel WR. A rear wheel axle 17 extending in the vehicle body width direction is provided to the rear portion of this swing arm 13. The rear wheel WR is rotatably cantilevered by the rear wheel axle 17.

FIGS. 1 and 2 show a headlight 41 for illuminating the forward of the vehicle body. An occupant seat 42 is attached to the horizontal portions 8b of the seat rail 8. A brake light 43 is attached to the rear end of the rear frame 7. A reflector 44 is disposed below the brake light 43.

Figure 3:
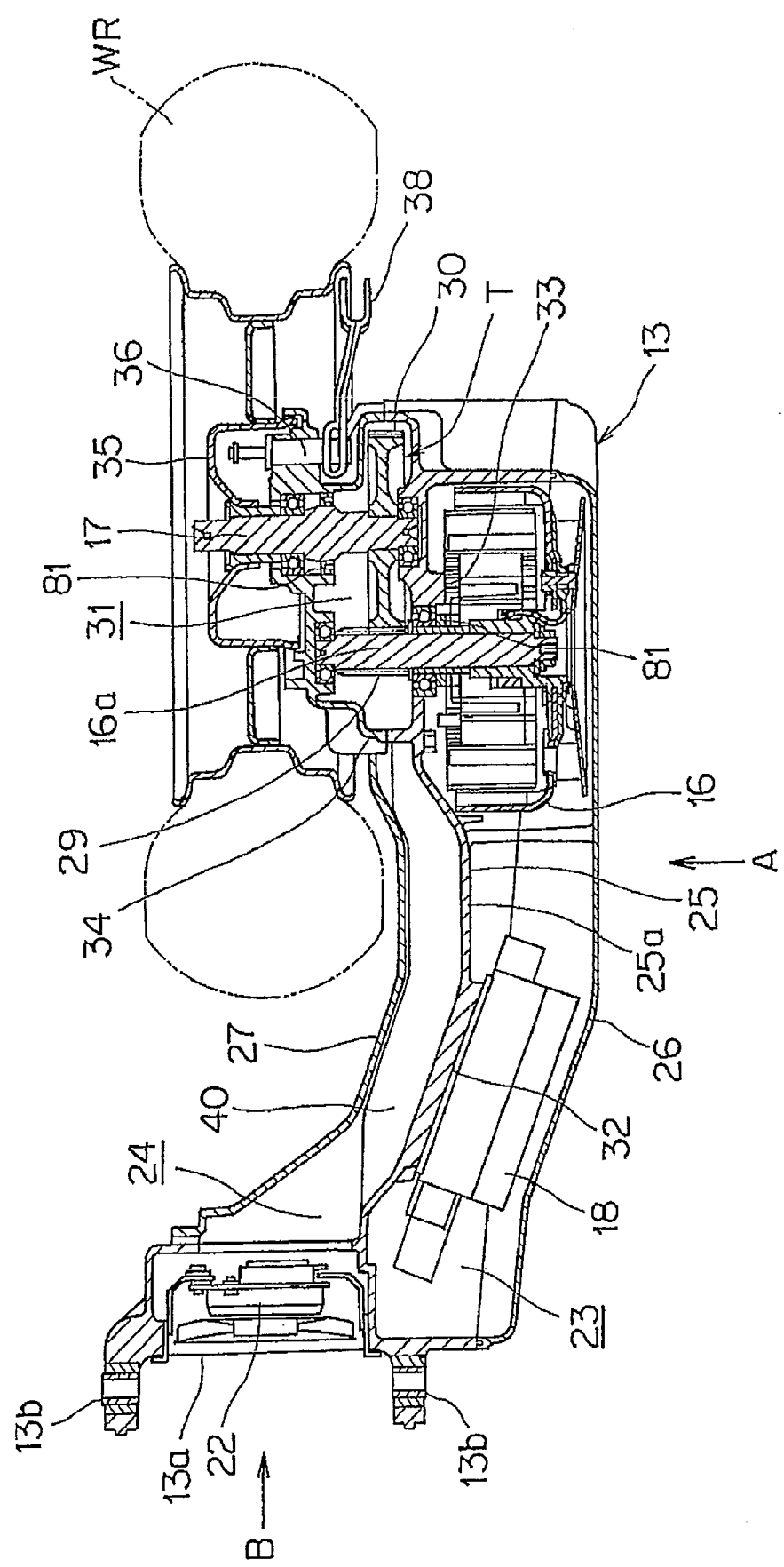
FIG. 3 is a sectional view along the line III-III of FIG. 1, and shows a swing arm alone.
Figure 4:
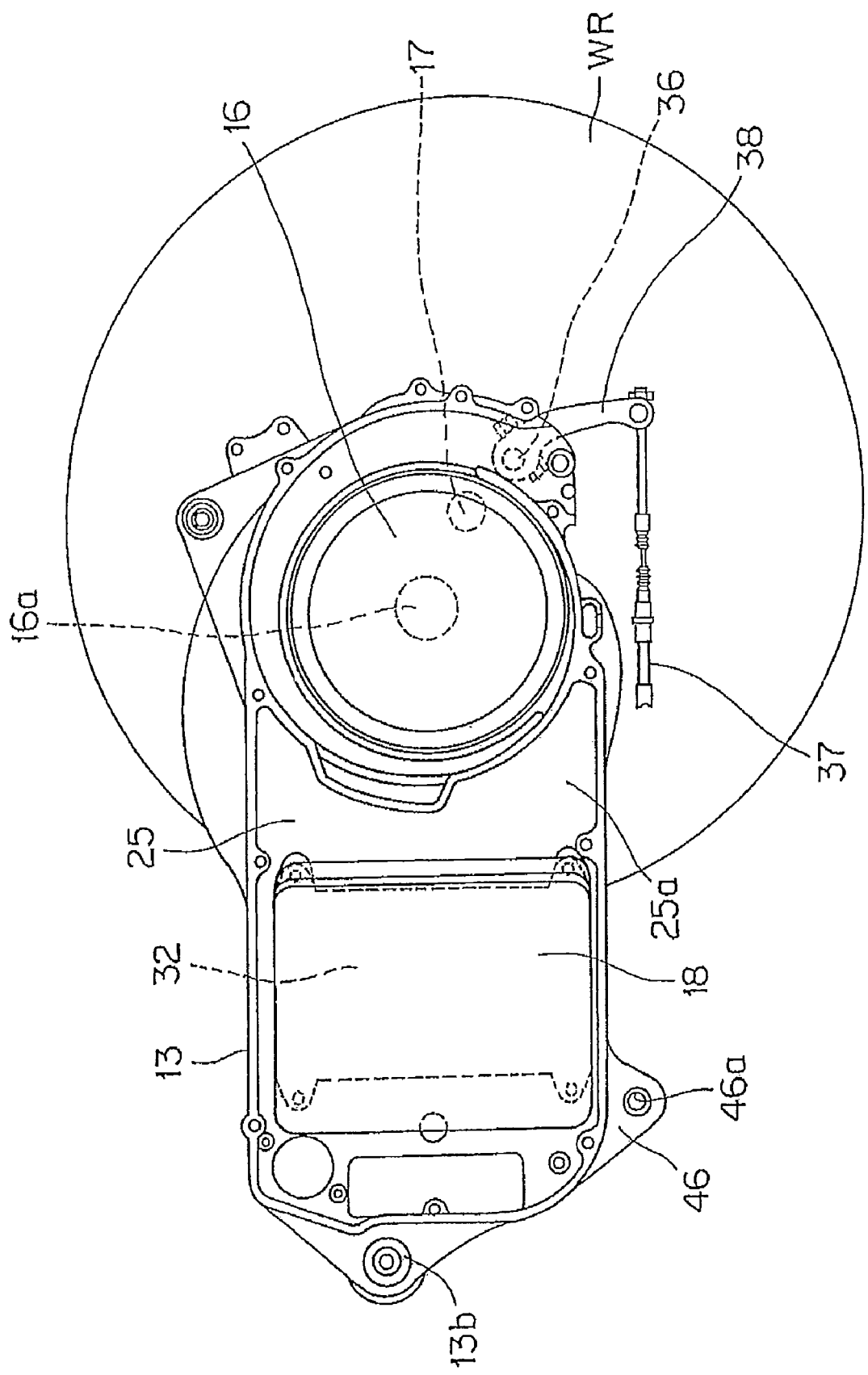
FIG. 4 is a right side view of FIG. 3.
Figure 5:
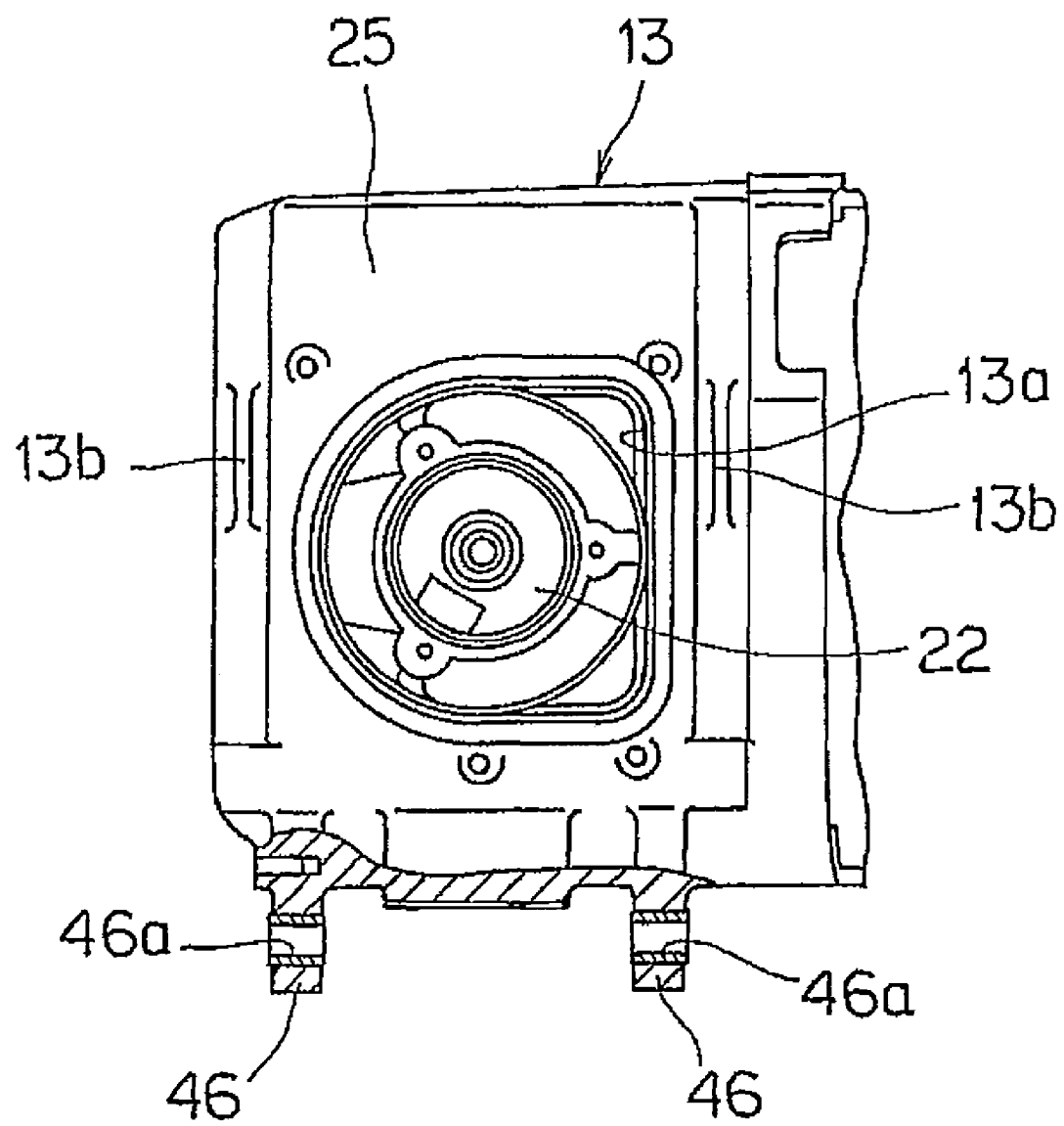
FIG. 5 is a view of FIG. 3 seen from a front of a vehicle.

FIG. 3 is a cross sectional view taken along line III-III of FIG. 1, showing the swing arm 13 alone. FIG. 4 is a left side view (in the direction of A of FIG. 3), showing the state where a left cover (outside cover) 26 shown in FIG. 3 has been removed. Further, FIG. 5 is a view of FIG. 3 seen from the forward of the vehicle body (from the direction of B of FIG. 3).

As shown in FIG. 3, the swing arm 13 is structured by assembling a body 25 having a partition wall 25a extending in the fore-and-aft direction of the vehicle body. The left cover 26 covers the left side of the body 25. A right cover 27 covers the right side of the body 25.

Two spaces, a device attachment space 23 disposed to the left of the vehicle body (the outer side of the vehicle body) and an air introduction space 24 disposed to the right of the vehicle body (the inner side of the vehicle body), are formed inside the swing arm 13. The spaces 23, 24 are respectively defined left and right in the vehicle body width direction by the above-described partition wall 25a, and are structured extending in the fore-and-aft direction of the vehicle body.

The left side of the device attachment space 23 is closed by removably attaching the above described left cover 26 by use of bolts, etc. Similarly, the right side of the air introduction space 24 is closed by removably attaching the above described right cover 27 by use of bolts, etc.

A power generating motor 16 for driving the rear wheel WR and a PDU 18 (Power Drive Unit) for controlling the power generating motor 16 are contained in the device attachment space 23. The maintenance of the power generating motor 16 and the PDU 18 is possible by removing the left cover 26.

As shown in FIG. 3, the power generating motor 16 is disposed on the rear portion of the swing arm 13, and is removably attached to a power generating motor attachment portion 33 formed to the partition wall 25a. In planar view, a driving shaft 16a of the power generating motor 16 is disposed to the rear end of the swing arm 13 and in a width of a wheel of the rear wheel WR in the fore-and-aft direction. The driving shaft 16a is disposed generally in parallel to the rear wheel axle 17 of the rear wheel WR, and penetrates the partition wall 25a and projects from the device attachment space 23 to the air introduction space 24. A driving gear 29 is formed on the driving shaft 16a, and is in meshing engagement with a reduction gear 30 provided on the rear wheel axle 17. The driving gear 29 has a smaller diameter than that of the reduction gear 30, and transmits a driving force of the power generating motor 16 to the rear wheel axle 17 through a single stage reduction.

That is, since the driving gear 29 is directly coupled to the reduction gear 30, the power generating motor 16 can be disposed close to the rear wheel axle 17, and the disposition space of the power generating motor 16 can be downsized. By coupling the driving gear 29 and the reduction gear 30 directly, a marginal space is produced in the swing arm 13, and the PDU 18 for controlling the power generating motor 16 can be contained in this space. Further, since a conventional pulley provided on a motor shaft of a power generating motor, a conventional pulley provided on a rear axle, and a conventional drive belt coupling each pulley are unnecessary, the number of components can be reduced, and power transmission efficiency can be also improved.

Since the driving shaft 16a is disposed close to the rear wheel axle 17, a driving force can be efficiently transmitted using a minimum number of gears without increasing the number of driving gears. Additionally, to match a usage rotation zone of the power generating motor 16 and a speed zone of the vehicle, the rear wheel WR is driven via the driving gear 29. Accordingly, the power generating motor 16 does not need to be enlarged beyond necessity.

A gear cover 34 is attached to the body 25 to cover a power transmission portion including the driving gear 29 and the reduction gear 30. The gear cover 34 defines a driving force transmission space 31, in which the power transmission portion is disposed, and the air introduction space 24. The driving force transmission space 31 is sealed to permit the driving force transmission space 31 to hold lubricating oil. As described above, since the sealed driving force transmission space 31 is filled with lubricating oil, which is circulated in the power transmission portion including the driving gear 29 and the reduction gear 30, the power transmission portion is driven smoothly.

A pin member 36 for activating a drum brake unit 35 is provided to the gear cover 34. The drum brake unit 35 operates by operating a brake handle 39 attached to a steering handlebar 3 on the left. For more details, a brake lever 38 pivots by operation of the brake handle 39 via a brake wire 37 shown in FIG. 4, and the brake of the rear wheel WR operates by operating the pin member 36 attached to the brake lever 38.

As shown in FIGS. 2 and 3, the PDU 18 is disposed forward of the power generating motor 16, and is removably attached, by use of bolts, etc., to a PDU attachment surface 32 formed to the partition wall 25a. A drive circuit, a capacitor, a heat sink, etc., which are not shown, are contained in the PDU 18.

The PDU 18 is connected to the batteries 9 by wiring, which is not shown. Electric power is sent to the PDU 18 from the batteries 9. The PDU 18 is also connected, by wiring, to an ECU (Electric Control Unit), which contains a control program, etc. but is not shown. A control signal is sent to the PDU 18 from the ECU. Further, the PDU 18 is also connected to the power generating motor 16 by wiring, which is not shown. Electric power and a control signal are sent to the power generating motor 16 from the PDU 18. The ECU mentioned above is attached to the vehicle body.

The drive circuit, etc. of the PDU 18 generates a larger amount of heat as compared with other components. Therefore, the PDU 18 adheres to as large an area of the PDU attachment surface 32 of the partition wall 25a as possible. Heat generated from, e.g., the drive circuit is thermally conducted to the partition wall 25a, and is released.

On the other hand, multiple cooling fins 40 project from the partition wall 25a in the air introduction space 24. Heat thermally conducted from the PDU 18 to the partition wall 25*a* is further thermally conducted to the cooling fins 40.

A front opening 13*a* is formed on the front end of the air introduction space 24. A cooling fan 22 for sending air into the air introduction space 24 is attached to the front opening 13*a*. The cooling fan 22 is disposed between the above battery box 19 and the PDU 18 in the side view shown in FIG. 1, and has a function for drawing air in the battery box 19 from an outlet 20*b*. In other words, the outlet 20*b* of the battery box 19 and the front opening 13*a* of the swing arm 13 generally match one another in the width direction and in the height direction of the vehicle body, and are opposed to one another. The air discharged from the outlet 20*b* is efficiently introduced into the front opening 13*a* by the cooling fan 22.

An air hole, through which the air introduction space 24 and the device attachment space 23 are in communication with one another, is formed to a portion of the partition wall 25*a* to which the power generating motor 16 is attached. Accordingly, the air introduced from the front opening 13*a* flows into the power generating motor 16 from the above mentioned air hole after passing through the air introduction space 24, and is discharged to the atmosphere after air cooling the inside of the power generating motor 16.

The power generating motors 16, the PDU 18, and the cooling fan 22 pivot vertically in response to pivots of the swing arm 13 together with the rear wheel WR.

As shown in FIG. 5, a pair of attachment portions 46 for supporting a main stand 45 is formed below the swing arm 13, the pair being separate from one another left and right in the vehicle body width direction. Thus, the main stand 45 is attached to the swing arm 13 by an attachment pin 46*b* (see FIG. 1) inserted into attachment holes 46*a* of the attachment portions 46, and pivots together with the swing arm 13.

Figure 6:
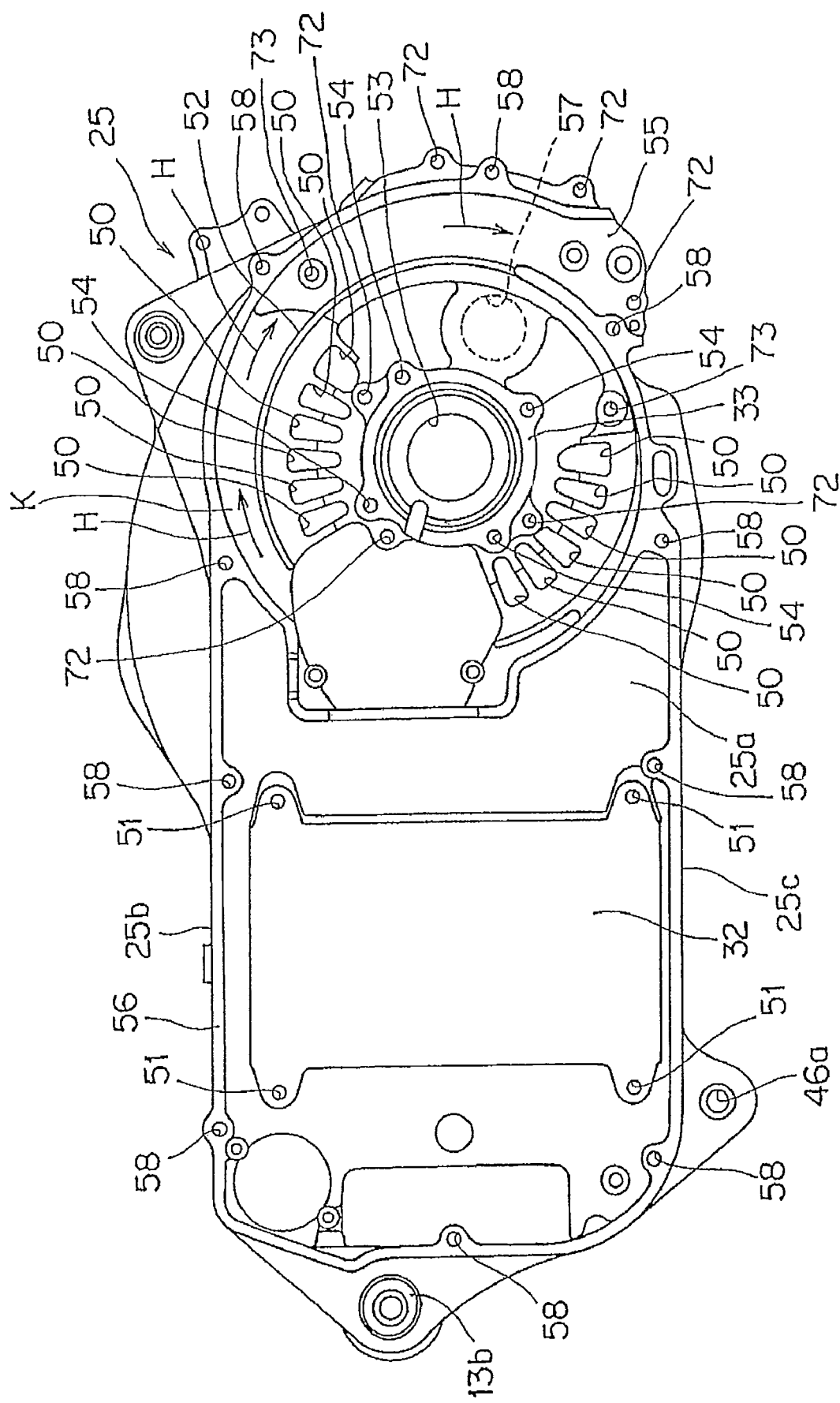
FIG. 6 is a side view of a body from a device attachment space.
Figure 7:
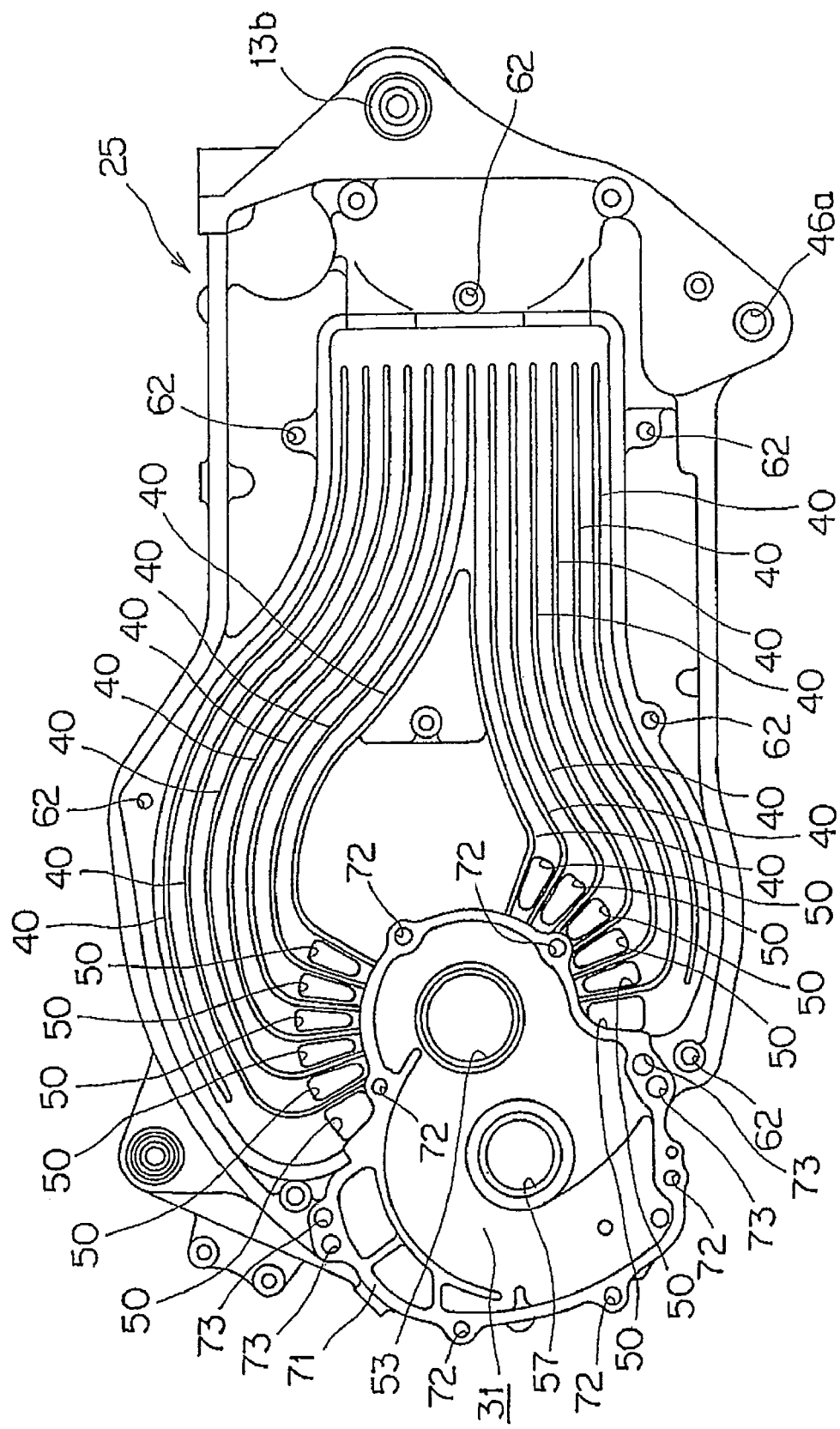
FIG. 7 is a side view of the body from an air introduction space side.
Figure 8:
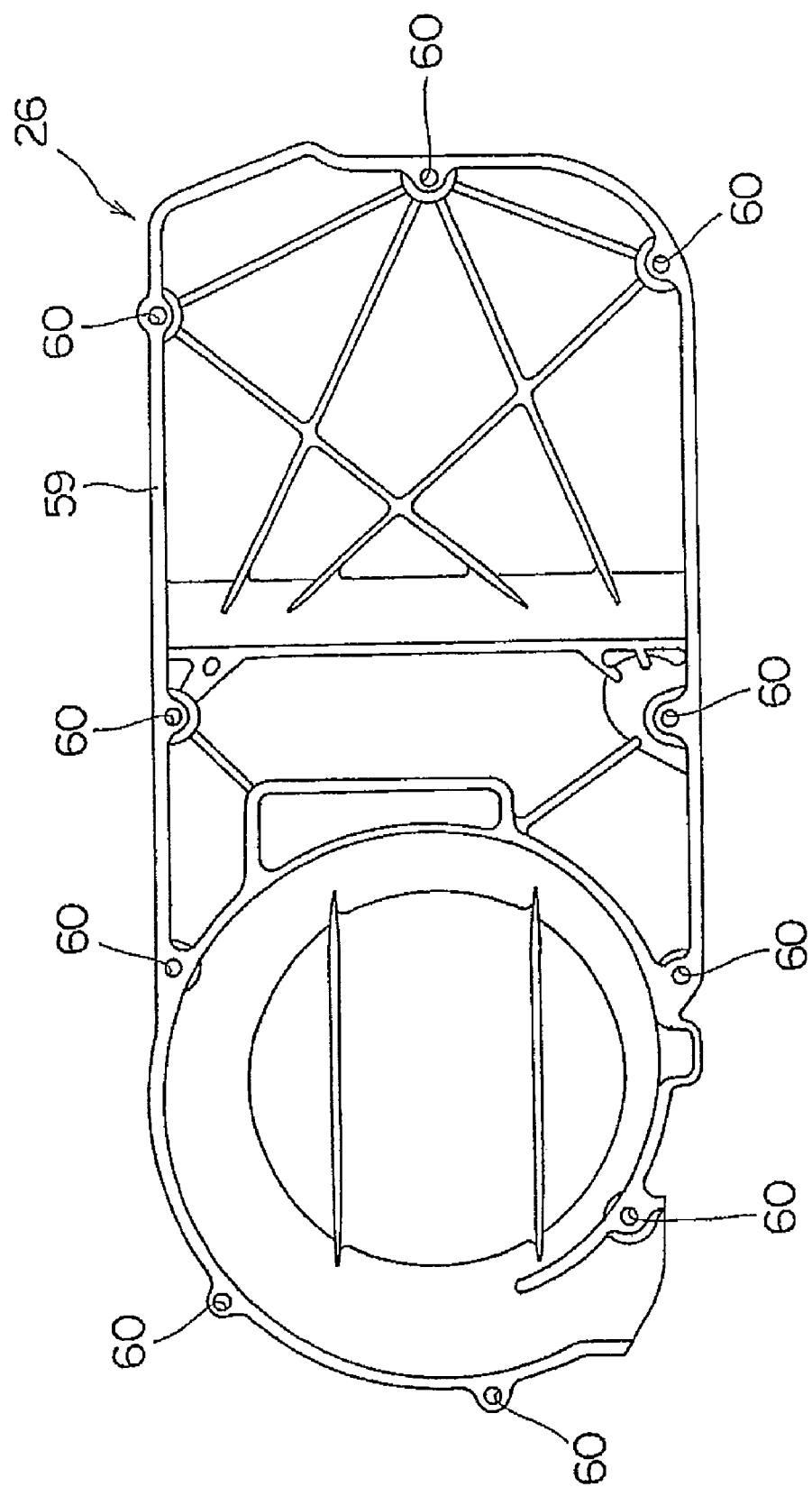
FIG. 8 is a front view of a left cover.
Figure 9:
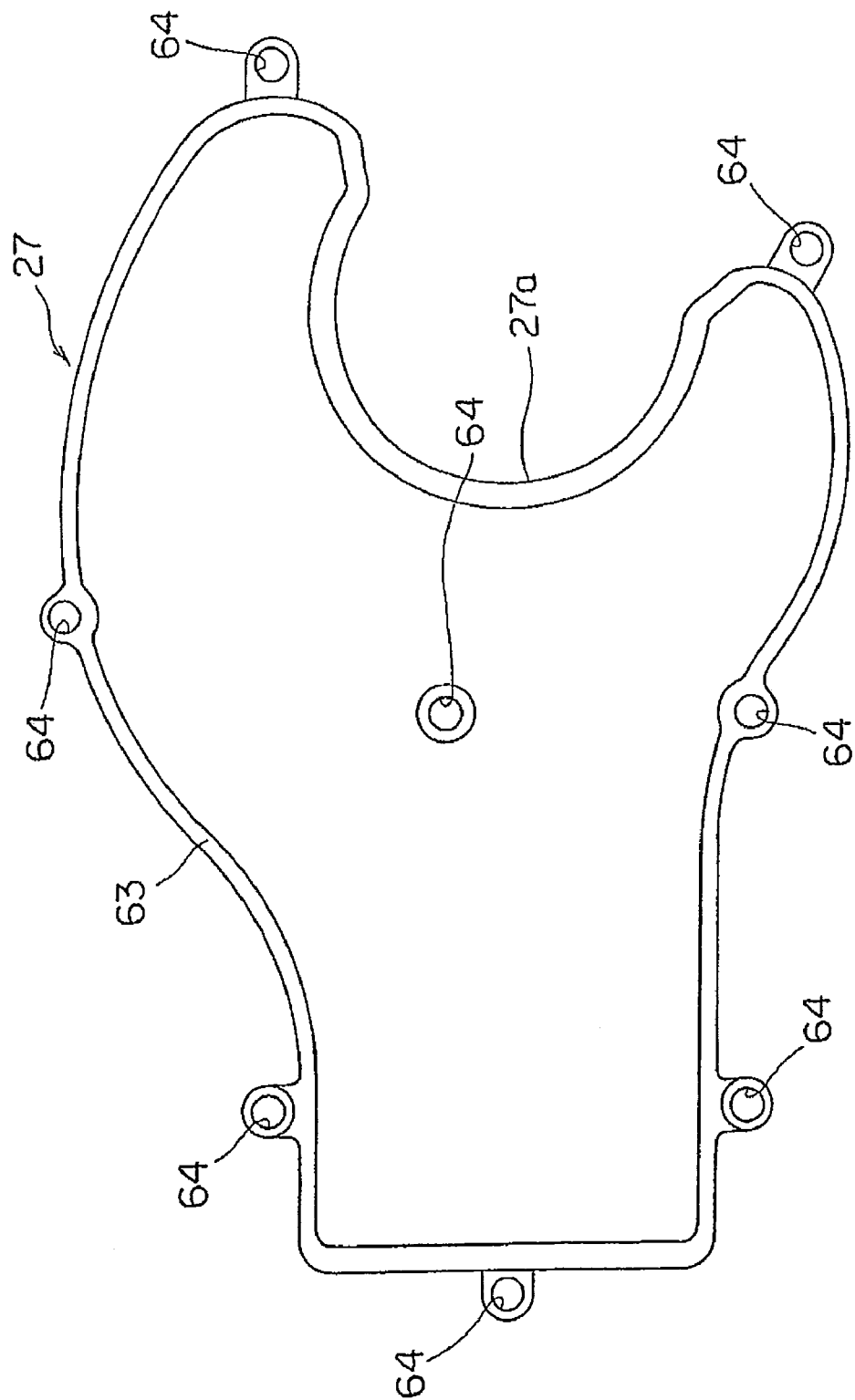
FIG. 9 is a front view of a right cover.
Figure 10:
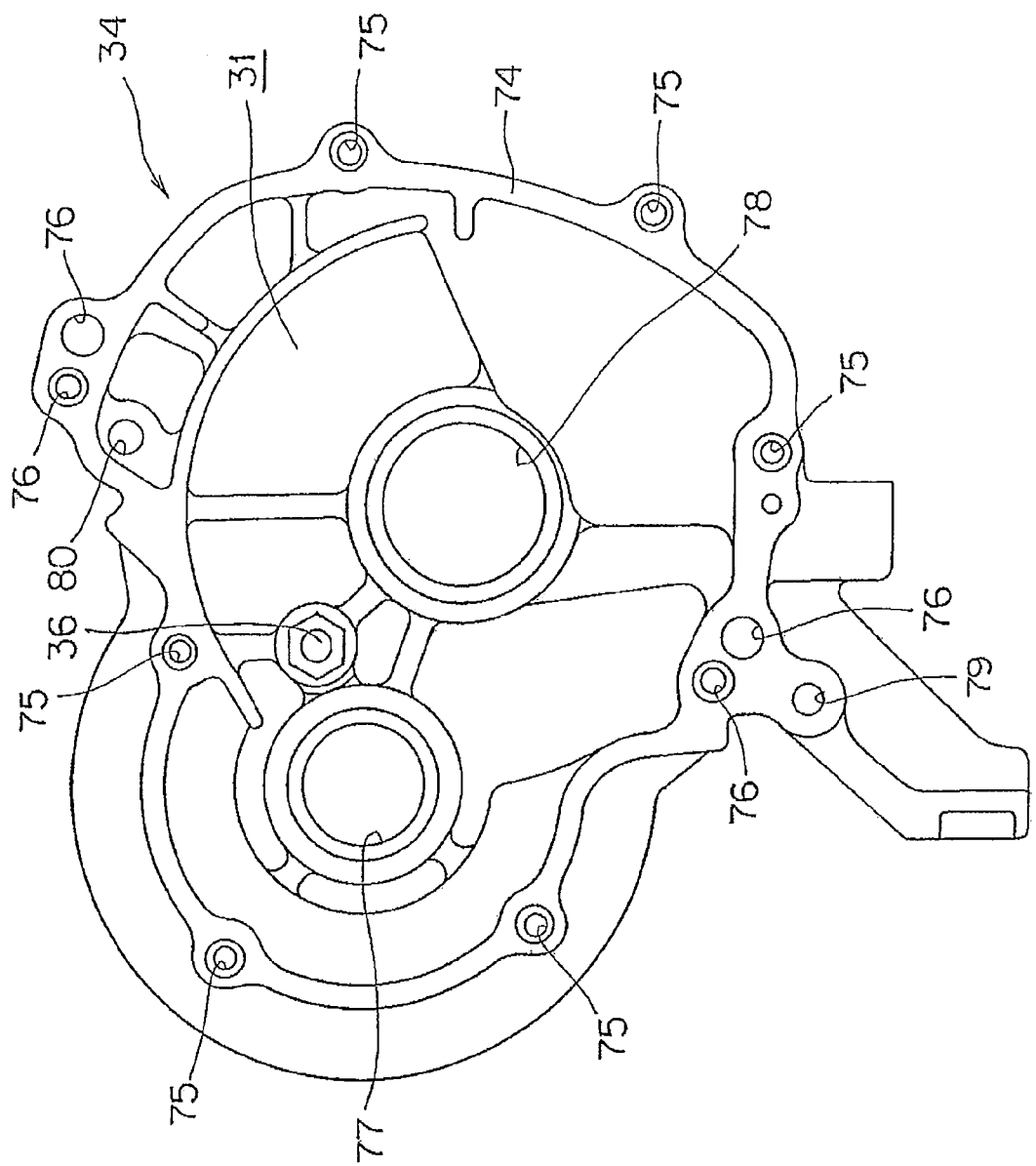
FIG. 10 is a side view of a gear cover seen from the left side (from a driving force transmission space)
Figure 11:
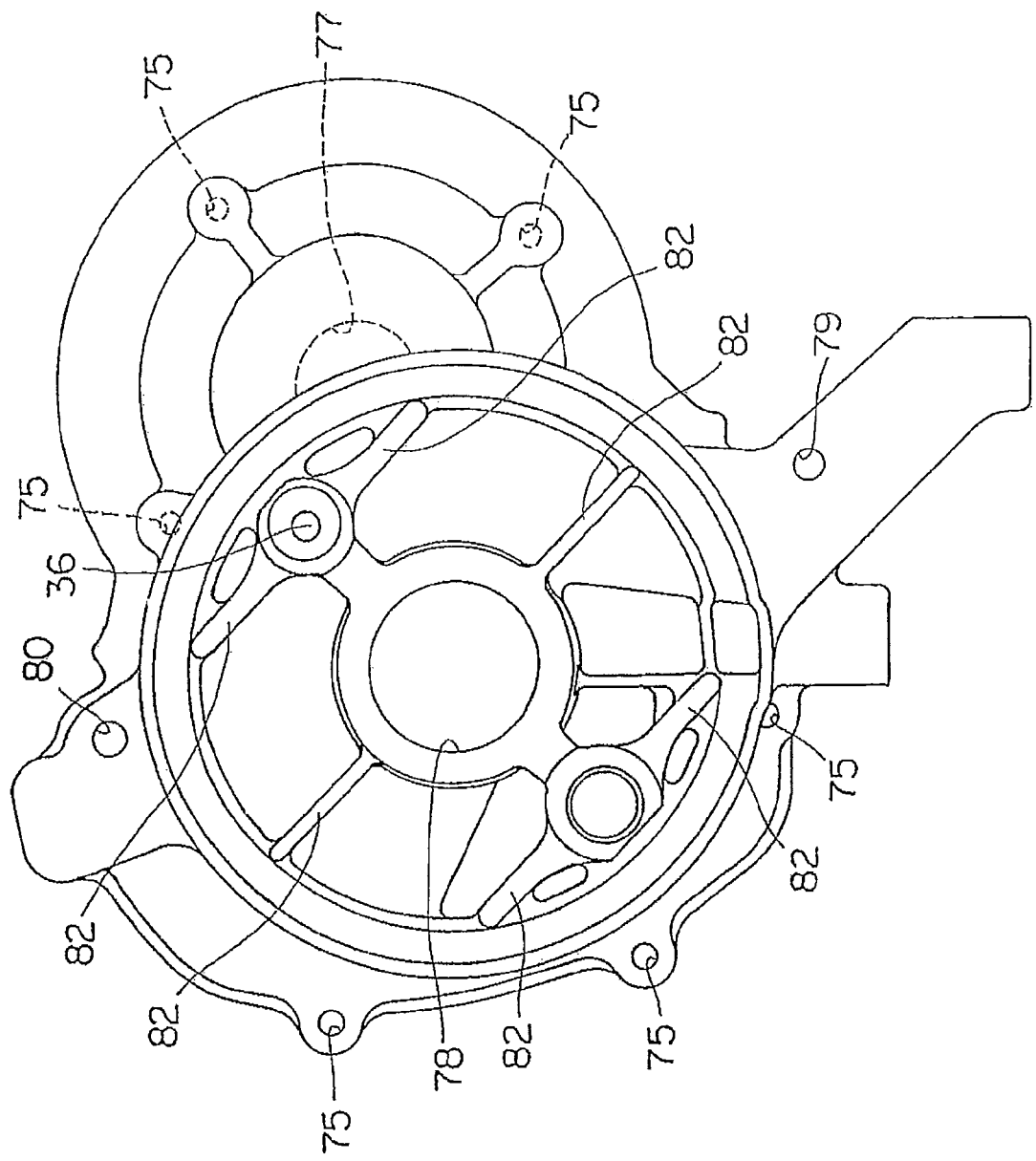
FIG. 11 is a side view of the gear cover seen from the right side.

FIG. 6 is a side view of the body 25 of the swing arm 13 seen from the left (from the device attachment space 23). FIG. 7 is a side view of the body 25 seen from the right (from the air introduction space 24). FIG. 8 is a front view of the left cover 26 seen from the body 25. FIG. 9 is a front view of the right cover 27 seen from the body 25. FIG. 10 is a side view of the gear cover 34 seen from the left (from the driving force transmission space 31). FIG. 11 is a side view of the gear cover 34 from the right.

The body 25 is molded by casting using an aluminum material excellent in thermal conductivity, and as shown in FIGS. 6 and 7, integrally formed from the above mentioned partition wall 25*a* and an upper surface portion 25*b* and a lower surface portion 25*c* vertically sandwiching the partition wall 25*a*.

The partition wall 25*a* extends along a shape of the swing arm 13 in the vehicle body fore-and-aft direction. As shown in FIG. 6, the PDU attachment surface 32 and the power generating motor attachment portion 33 are formed to the device attachment space 23. The PDU attachment surface 32 is disposed to a portion where the swing arm 13 extends obliquely from the vehicle body center portion toward the side (see FIGS. 2 and 3). The PDU attachment surface 32 is also formed to incline obliquely from the vehicle body center to the side from the front to rear of the vehicle body. The PDU attachment surface 32 and the fixing surface of the PDU 18 are each formed from a generally planar surface. The fixing surface of PDU 18 and the PDU attachment surface 32 adhere to one another. The adhesion surface is made large to increase thermal conductivity. PDU attachment holes 51 for fixing the PDU 18 with screws, etc. are formed to four corners of the PDU attachment surface 32, respectively.

Multiple air holes 50 through which the air introduction space 24 and the device attachment space 23 are in communication with one another, an air introduction wall 52 for introducing the air entering from the multiple air holes 50 in the circumferential direction of the power generating motor 16, and a penetration hole 53 through which the driving shaft 16*a* of the power generating motor 16 passes are formed to the power generating motor attachment portion 33. Attachment holes 54 for attaching the above mentioned power generating motor 16 are formed around the penetration hole 53.

The multiple air holes 50 are disposed outside the driving force transmission space 31 (see FIG. 3) covered with the above mentioned gear cover 34, and arranged in an arc around the penetration hole 53. The air introduction space 24 and the device attachment space 23 are in communication with one another through the air holes 50. The air flowing through the air introduction space 24 flows to the power generating motor 16 through the air holes 50.

As shown in FIG. 6, the air introduction wall 52 is formed generally in an arc, and forms a discharge path K for introducing the air which has flown to the power generating motor 16 (indicated by an arrow H in FIG. 6) from left and obliquely below to the right and obliquely below clockwise in the circumferential direction of the power generating motor attachment portion 33. Accordingly, after cooling a stator of the power generating motor 16, the stator not being shown, the air which has flown from the air holes 50 passes through the discharge path K and is discharged from an air discharge port 55 disposed below the body 25.

Such a shape of the air introduction wall 52 prevents rain water and dust outside the vehicle body from entering the power generating motor attachment portion 33 from the air discharge port 55 by introducing the air in the circumferential direction of the power generating motor 16.

Waterproof fins having a labyrinth structure are attached near the air discharge port 55 to further prevent rain water and dust from entering the power generating motor attachment portion 33 from the air discharge port 55.

As shown in FIG. 7, the multiple cooling fins 40 projecting from the partition wall 25*a* toward the air introduction space 24 (opposed to the device attachment space 23) are integrally formed to the partition wall 25*a*. The multiple cooling fins 40 pass from the front opening 13*a* through near the back side of the power generating motor attachment portion 33, and are curved in an arc along a circumference, which is an outside shape of the power generating motor 16. Then, the cooling fins 40 extend to the multiple air holes 50. The shapes of the fins have a function for introducing the air introduced from the front opening 13*a* to each of the air holes 50 through between the adjacent cooling fins 40. The cooling fins 40 extend from the back side of the PDU attachment surface 32 to the back side of the power generating motor attachment portion 33 to have a function for efficiently absorbing and releasing heat of the partition wall 25*a* corresponding to the back sides. The larger area of the partition wall 25*a* is in contact with the air by providing the multiple cooling fins 40. Accordingly, the cooling fins 40 function to release heat from the partition wall 25*a* efficiently.

Further, as shown in FIG. 7, a receiving portion 57 supporting a bearing attached to the left end of the rear wheel axle 17 is formed to the partition wall 25*a*.

On the other hand, as shown in FIG. 6, viewed from the device attachment space 23, multiple attachment holes 58 for attaching the left cover 26 are formed to an edge 56 of the upper surface portion 25*b* and the lower surface portion 25*c*. In response, as shown in FIG. 8, attachment holes 60 penetrating the outer surface of the left cover 26 are also formed to an edge 59 of the inner surface of the left cover 26 correspondingly to the attachment holes 58. By inserting, e.g., bolts into the attachment 60 to screw, e.g., the bolts into the attachment holes 58, the left cover 26 is removably attached to the body 25.

The left cover 26 may be integrally molded with an aluminum casting having excellent thermal conductivity, and may be integrally molded with a molded product made of resin.

Similarly, as shown in FIG. 7, viewed from the air introduction space 24, multiple attachment holes 62 for attaching the right cover 27 are also formed to edges 61 of the upper surface portion 25b and the lower surface portion 25c and to the central portion of the body 25. In response, as shown in FIG. 9, attachment holes 64 penetrating the outer surface of the right cover 27 are also formed on an edge 63 of the inner surface of the right cover 27 and the central portion of the right cover 27 correspondingly to the attachment holes 62. The right cover 27 can be removably attached to the body 25 by inserting bolts, etc. into the attachment holes 64 and screwing the bolts, etc. into the attachment holes 62.

As shown in FIG. 9, a rear end portion 27a of the right cover 27 is formed generally in an arcuate, concave shape to avoid the rear wheel axle 17 in the assembled state.

The right cover 27 may be integrally molded with an aluminum casting having excellent thermal conductivity, and may also be integrally molded with a molded product made of resin.

As shown in FIGS. 6 and 7, the attachment holes 46a for attaching the above described main stand 45 are formed on the lower portion of the front of the body 25, which is the lower surface portion 25c.

In addition, as shown in FIG. 7, a flat attachment surface 71 for attaching the gear cover 34 is formed on the body 25. Multiple attachment holes 72 for attaching the gear cover 34 and multiple knock holes 73 for inserting knock pins (not shown) are formed to the attachment surface 71. On the other hand, as shown in FIG. 10, a flat attachment surface 74 having generally the same shape as the attachment surface 71 is formed to the gear cover 34 correspondingly to the attachment surface 71 of the body 25. Attachment holes 75 penetrating the outer surface of the gear cover 34 are formed on the attachment surface 74 correspondingly to the attachment holes 72 of the body 25. Knock holes 76 are formed in the attachment surface 74 correspondingly to the knock holes 73 of the body 25.

A gasket having generally the same shape as the attachment surfaces 71, 74 but not shown are disposed between the gear cover 34 and the body 25. Attachment holes (not shown) corresponding to the attachment holes 72, 75 and knock holes (not shown) corresponding to the knock holes 73, 76 are formed in the gasket.

When the gear cover 34 is attached to the body 25, the knock pins (not shown) are inserted in the knock holes 73 of the body 25, respectively, and the knock holes open to the gasket are hooked by the knock pins projecting from the attachment surface 71. The gear cover 34 is removably attached to the body 25 by inserting the knock pins, which project from the attachment surface 71 into the knock holes 76, inserting, e.g., bolts into the attachment holes 75, and screwing, e.g., the bolts into the attachment holes 72 of the body 25. The driving force transmission space 31 is formed from the body 25 and the gear cover 34.

Further, a receiving portion 77 supporting a bearing attached to the right end of the power generating motor 16, a penetration hole 78 through which the rear wheel axle 17 (see FIG. 3) passes, a penetration hole (not shown) through which the above-mentioned pin member 36 passes, and a penetration hole 79 through which an attachment bolt of the mentioned above right cover 27 (see FIG. 9) passes are formed in the gear cover 34. The gear cover 34 is molded by casting using aluminum material excellent in thermal conductivity. As shown in FIG. 11, multiple ribs 82 are formed in the gear cover 34 to obtain sufficient strength to support the above-mentioned drum brake unit 35.

An oil fill port 80 is formed in the gear cover 34. The driving force transmission space 31 is filled with lubricating oil through the oil fill port 80. As shown in FIG. 3, oil seals 81 for preventing lubricating oil from leaking to the outside of the driving force transmission space 31 are provided around the rear wheel axle 17 penetrating the gear cover 34 and around the driving shaft 16a penetrating the partition wall 25a, respectively. Therefore, the driving force transmission space 31 is sealed with the gasket (not shown) disposed between the body 25 and the gear cover 34 and with the oil seals 81.

As explained above, the electric motorcycle 1 of the embodiment of the present invention is as follows. The driving shaft 16a of the power generating motor 16 is disposed generally in parallel with the rear wheel axle 17 of the rear wheel WR. The driving gear 29 is provided on the driving shaft 16a, and in meshing engagement with the reduction gear 30 provided on the rear wheel axle 17. The driving gear 29 has a smaller diameter than that of the reduction gear 30. A driving force of the power generating motor 16 is transmitted to the rear wheel axle 17 through a reduction to directly couple the driving gear 29 and the reduction gear 30. Accordingly, the power generating motor 16 can be disposed close to the rear wheel axle 17, and the disposition space of the power generating motor 16 can be downsized. Since a conventional pulley provided to a power generating motor, a conventional pulley provided to a rear wheel axle, and a conventional drive belt coupling each pulley are unnecessary, the number of components can be reduced, and power transmission efficiency can also be improved.

The gear cover 34 is provided to cover the power transmission portion including the driving gear 29 and the reduction gear 30. The inside of the gear cover 34 is sealed, and the driving force transmission space 31 is filled with lubricating oil, which is circulated in the power transmission portion including the driving gear 29 and the reduction gear 30. Accordingly, the power transmission portion is driven smoothly.

Further, the driving gear 29 and the reduction gear 30 are coupled directly to produce marginal space in the swing arm 13. The PDU 18 for controlling the power generating motor 16 can be contained in the marginal space. The power generating motor 16 is disposed close to the rear wheel axle 17, and the disposition space of the power generating motor 16 can be downsized. Since the gear cover 34 defines the driving force transmission space 31 and the air introduction space 24, the inside of the driving force transmission space 31 can be filled with the lubricating oil.

Since the driving shaft 16a is disposed, in planar view, on the rear end of the swing arm 13 and within the width of the rear wheel WR in the fore-and-aft direction, the driving shaft 16a is disposed close to the rear wheel axle 17. Without increasing the number of gears, the driving force can be transmitted efficiently by use of the minimum number of gears. In addition, the rear wheel WR is driven via the driving gear 29 to match the usage rotation zone of the power generating motor 16 and the speed zone of the vehicle. It is not necessary to enlarge the power generating motor 16 beyond necessity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric motorcycle, comprising:
a swing arm swingably supported by a vehicle body frame; and
a power generating motor supported by the swing arm, the power generating motor including a driving shaft coupled to an axle of a rear wheel, a driving force of the power generating motor being transmitted to the rear wheel,
wherein the driving shaft of the power generating motor is disposed generally in parallel to the axle of the rear wheel, and a driving gear is provided on the driving shaft,
the driving gear is in meshing engagement with a reduction gear provided on the axle of the rear wheel,
a driving force of the power generating motor is transmitted to the axle of the rear wheel through a reduction, and
a driving force transmission space in which the driving gear and the reduction gear are disposed is sealed and filled with lubricating oil.

2. The electric motorcycle according to claim 1, wherein a PDU is disposed forward of the power generating motor in a vehicle body.

3. The electric motorcycle according to claim 1, wherein the driving shaft is disposed to a rear end of the swing arm and within a wheel width of the rear wheel in a fore-and-aft direction in plane view.

4. An electric motorcycle, comprising:
a swing arm swingably supported by a vehicle body frame; and
a power generating motor supported by the swing arm, the power generating motor including a driving shaft coupled to an axle of a rear wheel, a driving force of the power generating motor being transmitted to the rear wheel,
wherein the driving shaft of the power generating motor is disposed generally in parallel to the axle of the rear wheel, and a driving gear is provided on the driving shaft, the driving gear is in meshing engagement with a reduction gear provided on the axle of the rear wheel, the driving gear has a smaller diameter than a diameter of the reduction gear, and a driving force of the power generating motor is transmitted to the axle of the rear wheel through a reduction, and
wherein a gear cover is provided to cover a power transmission portion including the driving gear and the reduction gear, an inside of the gear cover is sealed, and a driving force transmission space for the power transmission portion is filled with lubricating oil.

5. The electric motorcycle according to claim 4, wherein a partition wall defines, in the swing arm, a device attachment space disposed to an outer side of a vehicle body and an air introduction space disposed to an inner side of the vehicle body, the device attachment space contains the power generating motor and a PDU for controlling the power generating motor, the driving shaft of the power generating motor penetrates the partition wall from the device attachment space to the air introduction space, and the gear cover defines the driving force transmission space and the air introduction space.

6. The electric motorcycle according to claim 4, wherein a PDU is disposed forward of the power generating motor in a vehicle body.

7. The electric motorcycle according to claim 4, wherein the driving shaft is disposed to a rear end of the swing arm and within a wheel width of the rear wheel in a fore-and-aft direction in plane view.

8. An electric motorcycle, comprising:
a swing arm swingably supported by a vehicle body frame; and
a power generating motor supported by the swing arm, the power generating motor including a driving shaft coupled to an axle of a rear wheel, a driving force of the power generating motor being transmitted to the rear wheel,
wherein the driving shaft of the power generating motor is disposed generally in parallel to the axle of the rear wheel, and a driving gear is provided on the driving shaft,
the driving gear is in meshing engagement with a reduction gear provided on the axle of the rear wheel, the driving gear has a smaller diameter than a diameter of the reduction gear, and a driving force of the power generating motor is transmitted to the axle of the rear wheel through a reduction, and
wherein a partition wall defines, in the swing arm, a device attachment space disposed to an outer side of a vehicle body and an air introduction space disposed to an inner side of the vehicle body, the device attachment space contains the power generating motor and a PDU for controlling the power generating motor, the driving shaft of the power generating motor penetrates the partition wall from the device attachment space to the air introduction space, and the gear cover defines the driving force transmission space and the air introduction space.

9. The electric motorcycle according to claim 8, wherein the PDU is disposed forward of the power generating motor in a vehicle body.

10. The electric motorcycle according to claim 8, wherein the driving shaft is disposed to a rear end of the swing arm and within a wheel width of the rear wheel in a fore-and-aft direction in plane view.

11. An electric motorcycle, comprising:
a body frame;
a swing arm swingably supported by a vehicle body frame;
a rear wheel rotatably supported to the swing arm by an axle; and
a power generating motor supported by the swing aim, the power generating motor including a driving shaft coupled to the axle of the rear wheel to transmit a driving force of the power generating motor to the rear wheel,
wherein the driving shaft of the power generating motor is disposed generally in parallel to the axle of the rear wheel, a driving gear is provided on the driving shaft, the driving gear is in meshing engagement with a reduction gear provided on the axle of the rear wheel to transmit a driving force of the power generating motor to the axle of the rear wheel, and a driving force transmission space in which the driving gear and the reduction gear are disposed is sealed and filled with lubricating oil.

12. The electric motorcycle according to claim 11, wherein a PDU is disposed forward of the power generating motor in a vehicle body.

13. The electric motorcycle according to claim 11, wherein the driving shaft is disposed to a rear end of the swing arm and within a wheel width of the rear wheel in a fore-and-aft direction in plane view.

14. An electric motorcycle, comprising:
a body frame;
a swing arm swingably supported by a vehicle body frame;

a rear wheel rotatably supported to the swing arm by an axle; and a power generating motor supported by the swing arm, the power generating motor including a driving shaft coupled to the axle of the rear wheel to transmit a driving force of the power generating motor to the rear wheel, wherein the driving shaft of the power generating motor is disposed generally in parallel to the axle of the rear wheel, and a driving gear is provided on the driving shaft, and the driving gear is in meshing engagement with a reduction gear provided on the axle of the rear wheel to transmit a driving force of the power generating motor to the axle of the rear wheel, wherein a gear cover is provided to cover a power transmission portion including the driving gear and the reduction gear, an inside of the gear cover is sealed, and a driving force transmission space for the power transmission portion is filled with lubricating oil.

15. The electric motorcycle according to claim 14, wherein a partition wall defines, in the swing arm, a device attachment space disposed to an outer side of a vehicle body and an air introduction space disposed to an inner side of the vehicle body, the device attachment space contains the power generating motor and a PDU for controlling the power generating motor, the driving shaft of the power generating motor penetrates the partition wall from the device attachment space to the air introduction space, and the gear cover defines the driving force transmission space and the air introduction space.

16. The electric motorcycle according to claim 14, wherein a PDU is disposed forward of the power generating motor in a vehicle body.

17. The electric motorcycle according to claim 14, wherein the driving shaft is disposed to a rear end of the swing arm and within a wheel width of the rear wheel in a fore-and-aft direction in plane view.

18. An electric motorcycle, comprising:
a body frame;
a swing arm swingably supported by a vehicle body frame;
a rear wheel rotatably supported to the swing arm by an axle; and
a power generating motor supported by the swing arm, the power generating motor including a driving shaft coupled to the axle of the rear wheel to transmit a driving force of the power generating motor to the rear wheel, wherein the driving shaft of the power generating motor is disposed generally in parallel to the axle of the rear wheel, and a driving gear is provided on the driving shaft, and the driving gear is in meshing engagement with a reduction gear provided on the axle of the rear wheel to transmit a driving force of the power generating motor to the axle of the rear wheel, and wherein a partition wall defines, in the swing arm, a device attachment space disposed to an outer side of a vehicle body and an air introduction space disposed to an inner side of the vehicle body, the device attachment space contains the power generating motor and a PDU for controlling the power generating motor, the driving shaft of the power generating motor penetrates the partition wall from the device attachment space to the air introduction space, and the gear cover defines the driving force transmission space and the air introduction space.

19. The electric motorcycle according to claim 18, wherein the PDU is disposed forward of the power generating motor in a vehicle body.

20. The electric motorcycle according to claim 18, wherein the driving shaft is disposed to a rear end of the swing arm and within a wheel width of the rear wheel in a fore-and-aft direction in plane view.

* * * * *